L. M. DAVIS.
DISK HARROW.
APPLICATION FILED MAY 12, 1920.
1,362,854.
Patented Dec. 21, 1920.
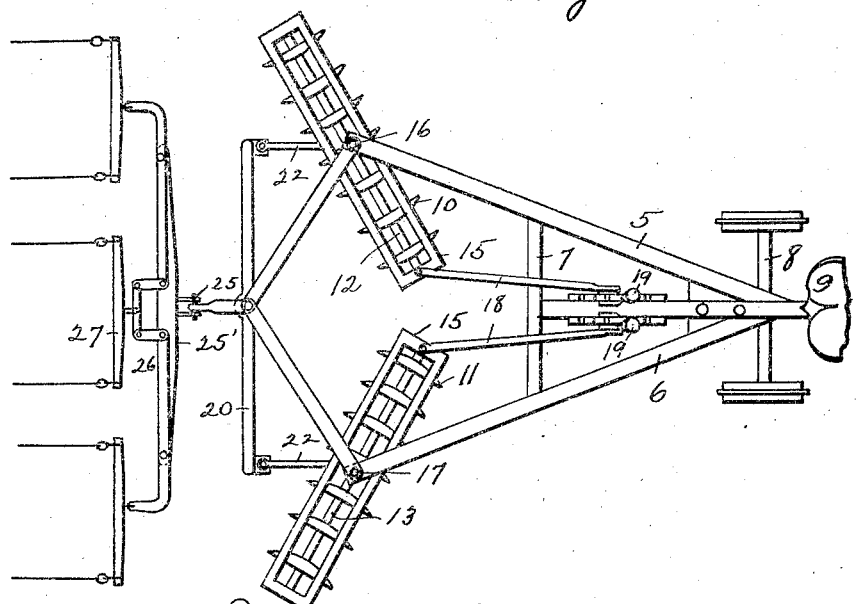
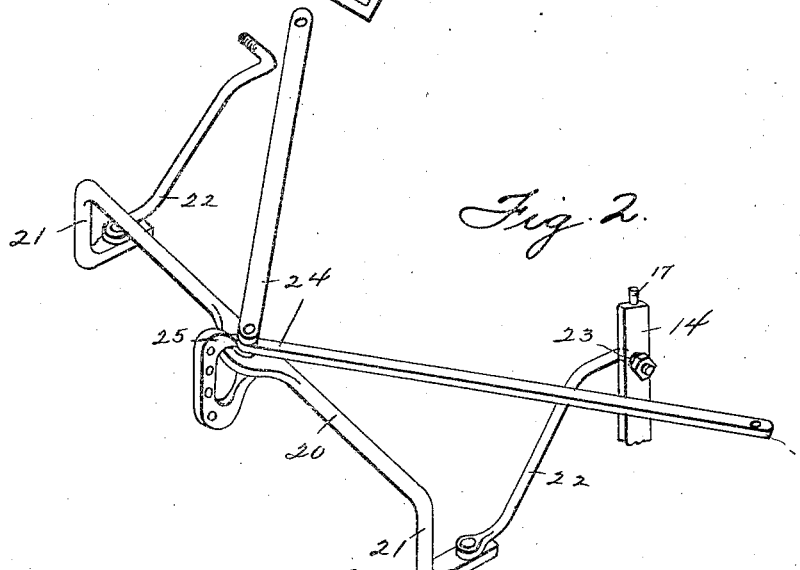
Lawrence M. Davis INVENTOR.
BY
Shepherd Campbell ATTORNEY.

UNITED STATES PATENT OFFICE.

LAWRENCE M. DAVIS, OF GALVA, IOWA.

DISK HARROW.

1,362,854.    Specification of Letters Patent.    Patented Dec. 21, 1920.

Application filed May 12, 1920. Serial No. 380,869.

*To all whom it may concern:*

Be it known that I, LAWRENCE M. DAVIS, citizen of the United States, residing at Galva, in the county of Ida and State of Iowa, have invented certain new and useful Improvements in Disk Harrows, of which the following is a specification, reference being had therein to the accompanying drawings.

The object of the present invention is to provide an improved harrow of the disk type constructed in such manner that the depth of the cut may be easily and accurately controlled.

A further object of the invention is to provide, in a harrow of the character indicated, a novel draft frame constituting the connection between the team and the harrow said draft frame being so arranged as to cause the disk to be forced into engagement with the ground under the pull of the team as will be hereinafter set forth.

Further objects and advantages of the invention will be set forth in the detailed description which follows.

In the accompanying drawings:

Figure 1 is a plan view of a harrow constructed in accordance with the invention; and Fig. 2 is a perspective view of the novel draft frame hereinafter described.

Like numerals designate corresponding parts throughout the drawing.

An A frame consisting of the divergent bars 5 and 6 and cross bar 7 has its rear end supported upon a truck 8, and carries a seat 9 at its rear end.

The gangs of disks 10 and 11 are mounted upon shafts 12 and 13, said shafts in turn being journaled in bearings carried by depending members 14, of elongated rectangular frames 15, this type of construction being common in disk harrows. The points 16 and 17 constitute pivots about which the frames 15 and the gangs of disks may be adjusted, this adjustment being effected by means of links 18 that are connected to the inner ends of the frames 15, and swinging hand levers indicated at 19. This means for effecting movement of the frame 15 and the gangs of disks carried thereby, to throw them to an angle with respect to each other or into longitudinal alinement with each other, is also common in harrows.

In all of the disk harrows with which I am familiar the draft is applied substantially in the line of the shafts 12 and 13. In other words the pull is substantially at the centers of the disks and this tends to pull the disks out of the ground. It is desirable to provide means for applying the draft in such manner that the disks will be drawn toward the ground and also to provide means for controlling the extent of this action to thereby determine the depth of the cut.

To this end I provide a stout bar 20 which extends practically entirely across the front of the harrow and has down turned ends 21. Rods 22 engage inturned portions of these ends and extend inwardly and upwardly and are engaged at 23 with those vertical members 14 which constitute the pivots 16 and 17. The turning movement of these vertical members, since they constitute the centers about which the frames 15 swing, is very slight, and connection of the upper ends of the rods 22, therewith, may be sufficiently loose to permit this movement. Straps 24 are connected to the central part of the bar 20 and extend divergently and rearwardly to the pivots 16 and 17. In other words the bar 20 is in effect hung in front of the gangs of disks and connected to said gangs of disks in such manner as to apply the draft at a point above the centers of the disks, but in such manner as not to interfere with the movement of the gangs of disks with respect to each other.

An adjustable clevis 25 of a usual and well known type constitutes the connection between bar 20 and a double tree 25'. This double tree carries a draft equalizing mechanism indicated in a general way at 26, which in turn carries the swingletrees 27. This draft equalizing mechanism requires no further description since it is of a usual and well known form. It is manifest that adjustment of the clevis will determine the degree of downward pull effected through the team upon the disks and will consequently accurately determine the depth of cut, in general.

The location of the truck and the seat in the rear of the disks enables the operator to more accurately control the action of the disks because if the harrow strikes a hard piece of ground, the operator may shift his weight forwardly to increase the weight on the disk, while if the harrow strikes a soft piece of ground, the operator may dispose his weight so that it will be supported practically entirely by the truck. In other words this arrangement provides a counterweight at this point.

From the foregoing description it will be seen that simple and efficient means are herein provided for accomplishing the objects of the invention. However, it is to be understood that the invention is not limited to the precise construction set forth but that it includes within its purview whatever changes fairly come within either the terms or the spirit of the appended claims.

Having described my invention, what I claim is—

1. A device of the character described comprising a pair of gangs of disks, frames carried thereby, a rearwardly projecting frame, a truck and a seat at the rear of the rearwardly projecting frame, means for pivotally connecting the frames of the disks to the rearwardly projecting frame, a bar disposed across the front of said disk having downwardly projecting portions at its ends, members extending between said downwardly projecting portions and the frames of the disk at the pivotal points of the latter and straps extending from the central portion of said bar to the said pivotal points.

2. A structure as recited in claim 1 in combination with a double tree and a clevis uniting the said double tree with the central portion of said bar.

In testimony whereof I hereunto affix my signature.

LAWRENCE M. DAVIS.